(12) United States Patent
Maruyama et al.

(10) Patent No.: US 10,429,606 B2
(45) Date of Patent: Oct. 1, 2019

(54) LENS DRIVE UNIT

(71) Applicant: TDK CORPORATION, Tokyo (JP)

(72) Inventors: Toshiki Maruyama, Tokyo (JP); Naoki Yusa, Tokyo (JP); Seiji Fukuoka, Tokyo (JP); Masahiro Hosokawa, Tokyo (JP); Mio Hamashima, Tokyo (JP); Hiroshi Tojo, Tokyo (JP); Mitsunao Homma, Tokyo (JP); Takuto Horii, Tokyo (JP); Atsushi Ezawa, Tokyo (JP); Tatsuya Taki, Tokyo (JP)

(73) Assignee: TDK CORPORATION, Tokyo (JP)

( * ) Notice: Subject to any disclaimer, the term of this patent is extended or adjusted under 35 U.S.C. 154(b) by 208 days.

(21) Appl. No.: 15/642,090

(22) Filed: Jul. 5, 2017

(65) Prior Publication Data

US 2018/0011282 A1    Jan. 11, 2018

(30) Foreign Application Priority Data

Jul. 5, 2016    (JP) .................................. 2016-133641

(51) Int. Cl.
*G02B 7/02*    (2006.01)
*H02N 2/04*    (2006.01)

(52) U.S. Cl.
CPC ............. *G02B 7/023* (2013.01); *H02N 2/043* (2013.01)

(58) Field of Classification Search
CPC . G02B 7/023; G02B 7/08; G02B 7/04; H02N 2/043; H02N 2/00; H02N 2/025
See application file for complete search history.

(56) References Cited

U.S. PATENT DOCUMENTS

2012/0218651 A1 *    8/2012    Onishi ..................... G02B 7/08
                                                            359/824

FOREIGN PATENT DOCUMENTS

JP    2015-89183 A    5/2015
JP    2015089183 A  *  5/2015

* cited by examiner

*Primary Examiner* — William R Alexander
*Assistant Examiner* — Ephrem Z Mebrahtu
(74) *Attorney, Agent, or Firm* — Oliff PLC (57) ABSTRACT

A lens drive unit that offers enhanced reliability in connection between an actuator electrode and an electric wire is provided. In the lens drive unit, an actuator has a weight housed in an holding portion of a base member and is thereby fixed in the base member. Electrodes on a lateral surface of the weight directly contact respective terminal electrodes on an inner lateral surface of the holding portion, so that an electrical connection is established therebetween. The arrangement enhances reliability in connection between the actuator electrodes and the terminal electrodes.

4 Claims, 6 Drawing Sheets

LENS DRIVE UNIT

CROSS-REFERENCE TO RELATED APPLICATIONS

This application is based upon and claims the benefit of priority from Japanese Patent Application No. 2016-133641, filed on 5 Jul. 2016, the entire content of which is incorporated herein by reference.

TECHNICAL FIELD

This disclosure relates to a lens drive unit.

BACKGROUND

A known lens drive unit for an imaging device mounted in a cellular phone incorporates a smooth impact drive mechanism (SIDM: a registered trademark).

Japanese Unexamined Patent Publication No. 2015-089183, for example, discloses a lens drive unit that incorporates the smooth impact drive mechanism. This lens drive unit comprises an actuator including a piezoelectric element having a rectangular columnar shape, a weight joined with one end face of the piezoelectric element in a direction of extension and contraction of the piezoelectric element, and a drive shaft joined with the other end face of the piezoelectric element in the direction of extension and contraction of the piezoelectric element. The weight of the actuator is fixed to a base member and a friction engagement unit frictionally engages an outer periphery of the drive shaft of the actuator. In the lens drive unit described above, extension and contraction of the actuator is imparted to the drive shaft and the friction engagement unit frictionally engaging the drive shaft with a predetermined friction force is driven by making use of a difference in speed between when the actuator extends and when the actuator contracts.

The friction engagement unit includes a lens frame fitted with a lens having an optical axis extending in parallel with a direction of extension and contraction of the actuator. Causing the friction engagement unit to advance and retract in the direction of extension and contraction of the actuator results in the lens frame advancing and retracting.

In the lens drive unit described above, the lens frame of the friction engagement unit is displaced with respect to the base member in a direction orthogonal to the direction in which the friction engagement unit advances and retracts to press the drive shaft by impact from an outside of the lens drive unit or the like. In this case, the piezoelectric actuator is inclined with respect to the base member, the weight of the actuator is dislocated from the base member, and an electric wire for applying voltage to the piezoelectric element of the actuator is broken, resulting in a short-circuited electric wire.

The present disclosure provides a lens drive unit that offers enhanced reliability in connection between an actuator electrode and an electric wire.

SUMMARY

A lens drive unit according to one aspect of the present disclosure comprises: an actuator, the actuator including: a piezoelectric element configured to be capable of extending and contracting in one direction; a weight joined with one end face of the piezoelectric element in a direction of extension and contraction of the piezoelectric element; and a shaft joined with the other end face of the piezoelectric element in the direction of extension and contraction of the piezoelectric element; a friction engagement member frictionally engaging an outer periphery of the shaft of the actuator; a lens frame coupled to the friction engagement member; a base member including a holding portion recessed to have a shape of the weight of the actuator to thereby house the weight, the base member being configured to fix the actuator in the holding portion; a pair of electrodes disposed on the weight, the pair of electrodes being electrically connected with a pair of electrodes disposed in the piezoelectric element; and a pair of electric wires disposed on an inner lateral surface of the holding portion, the pair of electric wires contacting the pair of electrodes disposed on the weight.

In the lens drive unit, when a difference in speed is produced between when the actuator extends and when the actuator contracts during the extension and contraction of the actuator, the friction engagement member that is frictionally engaged with the outer periphery of the shaft of the actuator is driven in the direction of extension and contraction of the actuator. As the friction engagement member is driven, the lens frame coupled to the friction engagement member is also driven in the direction of extension and contraction of the actuator.

The actuator has the weight housed in the holding portion of the base member and is thereby fixed in the base member. At this time, the electrodes of the weight directly contact the respective electric wires on the inner lateral surface of the holding portion. As a result, dislocation of the weight from the base member and break of the electric wire applying voltage to the piezoelectric element of the actuator are effectively prevented. The arrangement enhances reliability in connection between the actuator electrodes and the electric wires.

The lens drive unit according to another aspect of the present disclosure, further includes: at least two protrusions disposed on an inner lateral surface of the holding portion, the two protrusions each contacting the weight housed in the holding portion.

In the lens drive unit according to another aspect of the present disclosure, at least one of the two protrusions is disposed at a position facing positions at which the electric wires are disposed across an axis of the actuator as viewed from the direction in which the actuator extends and contracts.

In the lens drive unit according to another aspect of the present disclosure, the friction engagement member includes, on a side of one end of the friction engagement member, a slider portion held by the lens frame and a spring portion biased toward the slider portion, and the slider portion and the spring portion clamp therebetween the shaft of the actuator to frictionally engage the shaft of the actuator.

In the lens drive unit according to another aspect of the present disclosure, the friction engagement member has the one end extending in a direction orthogonal to the direction of extension and contraction of the actuator and frictionally engaging an outer periphery of the shaft of the actuator, and the friction engagement member has the other end coupled to the lens frame such that a lens is to be mounted so as to have a lens optical axis oriented in a direction extending in parallel with the direction of extension and contraction of the actuator.

DETAILED DESCRIPTION

An embodiment of the present disclosure will be described in detail below with reference to the accompanying drawings. In the description that follows, like elements or elements having like functions are identified by like reference numerals and descriptions for those elements will be omitted.

Figure 1:
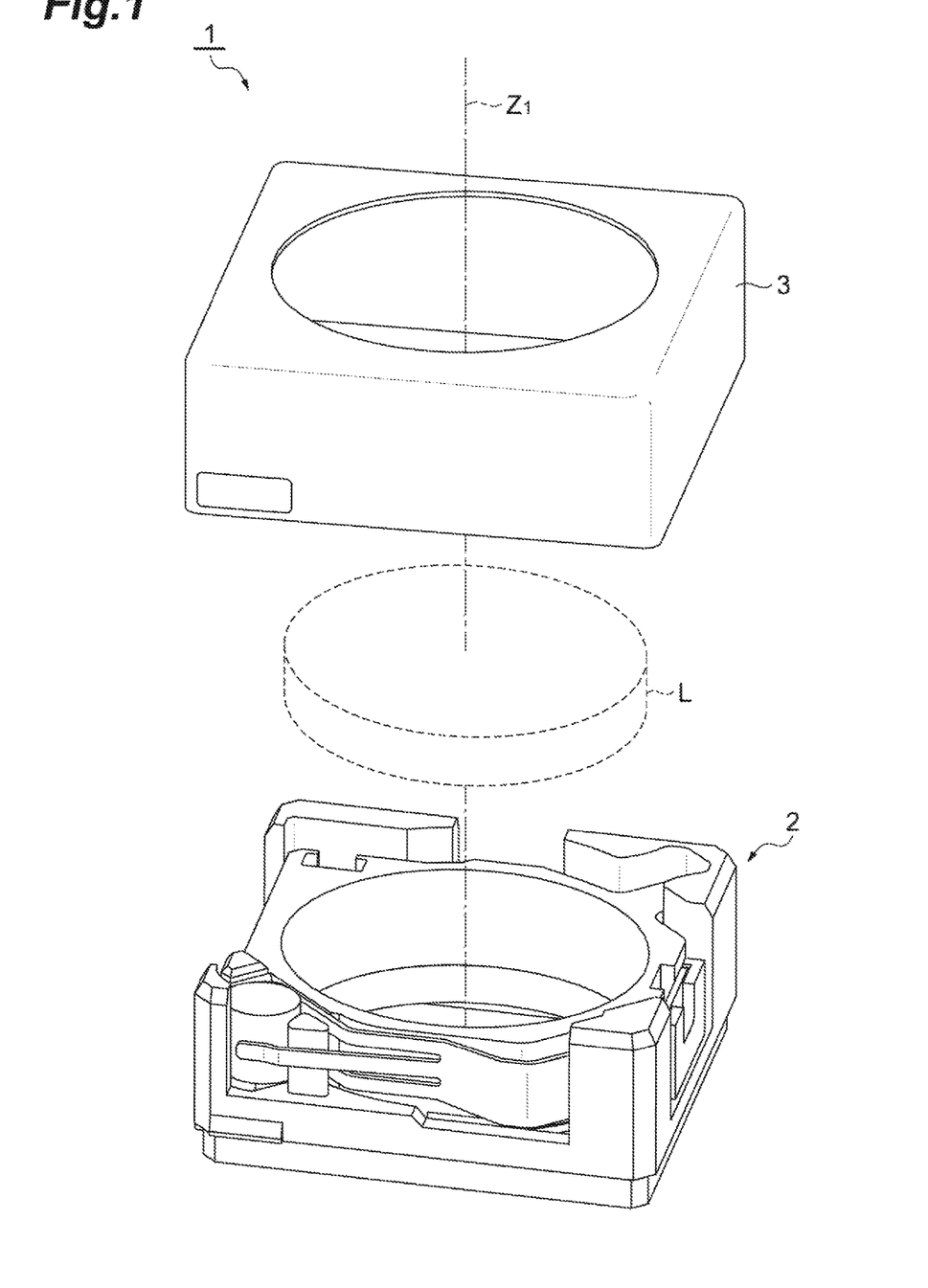
FIG. 1 is an exploded perspective view illustrating a lens drive unit according to one embodiment.

As illustrated in FIG. 1, a lens drive unit 1 includes a lens drive section 2 and a cover 3 that covers the lens drive section 2. The lens drive unit 1 has a lens optical axis Z1 that serves as an optical axis of a lens L to be mounted in the lens drive unit 1.

Figure 2:
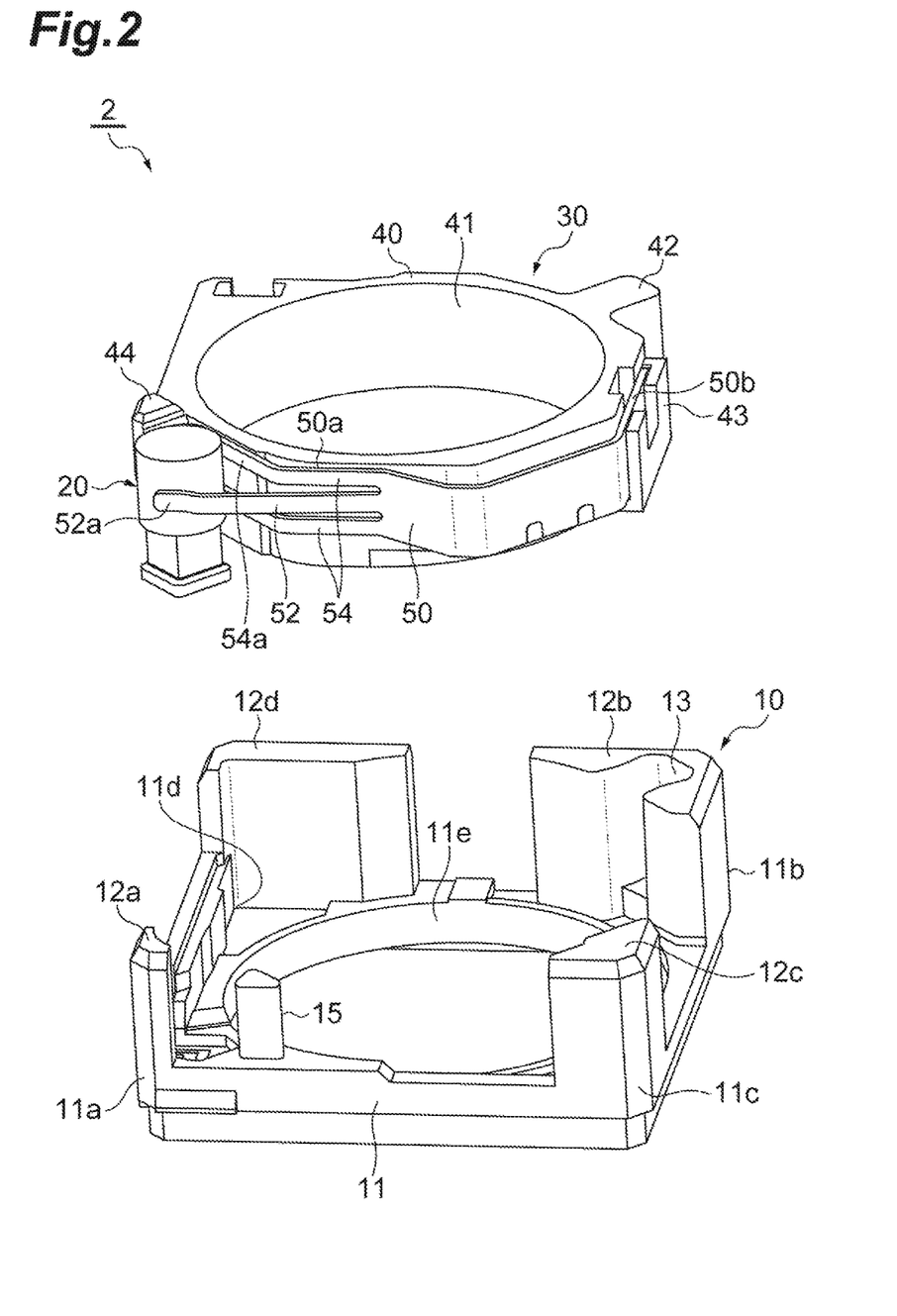
FIG. 2 is an exploded perspective view illustrating a lens drive section illustrated in FIG. 1.

As illustrated in FIG. 2, the lens drive section 2 includes a base member 10, an actuator 20, and a friction engagement unit 30.

The base member 10 includes a bottom 11, a first lateral wall 12a, a second lateral wall 12b, a third lateral wall 12c, and a fourth lateral wall 12d. The bottom 11 has a rectangular shape in a plan view. The bottom 11 has an opening 11e formed in a central portion thereof. The opening 11e has a completely circular shape in a plan view. The base member 10 is formed of a resin material (e.g., a liquid crystal polymer) including a filler that is formed, for example, of glass or an inorganic material. The base member 10 may be molded by, for example, injection molding.

The bottom 11 of the base member 10 includes a first corner 11a, a second corner 11b, a third corner 11c, and a fourth corner 11d. The first corner 11a and the second corner 11b are disposed at mutually diagonal positions. The third corner 11c and the fourth corner 11d are disposed at mutually diagonal positions.

The first to fourth lateral walls 12a to 12d are erected in a standing condition from the first to fourth corners 11a to 11d of the bottom 11, respectively. The first to fourth lateral walls 12a to 12d are each formed of a material identical to a material that is used to form the bottom 11 and are each formed integrally with the bottom 11.

The second lateral wall 12b has a cutout 13 formed in an inside thereof at a position corresponding to a first protrusion 42 of a lens frame 40 to be described later.

An actuator holding portion 14 (Holding portion) is disposed inside the first lateral wall 12a at the first corner 11a. The actuator holding portion 14 houses an end of the actuator 20 on the side adjacent to the base member 10. The actuator holding portion 14 is a recess having a rectangular shape in a plan view.

A column 15 is erected in a standing condition from the base member 10 at a position near and inside the first lateral wall 12a at the first corner 11a. The column 15 is disposed at a position between a spring portion 52 and a shaft receiver 54 of a friction engagement member 50 to be described later. The column 15 is formed of a material identical to a material that is used to form the base member 10 and is formed integrally with the base member 10.

A configuration of the actuator 20 will be described below with reference to FIG. 4.

Figure 4:
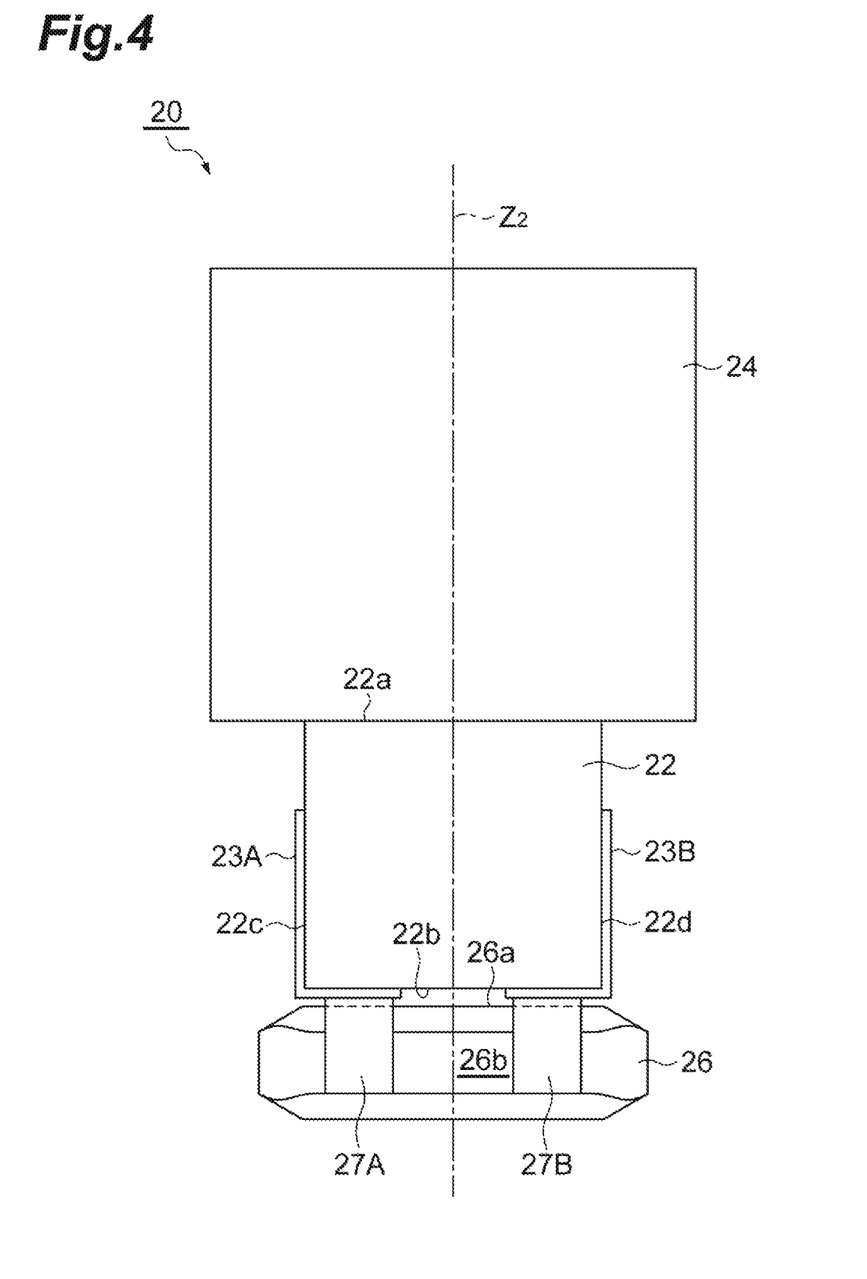
FIG. 4 is a side-elevational view illustrating the actuator illustrated in FIG. 3.

As illustrated in FIG. 4, the actuator 20 includes a piezoelectric element 22, a drive shaft 24, and a weight 26. The piezoelectric element 22 has a rectangular columnar shape. The drive shaft 24 is joined with a top surface 22a of the piezoelectric element 22. The weight 26 is joined with a bottom surface 22b of the piezoelectric element 22. The piezoelectric element 22 may be bonded with the drive shaft 24 and the weight 26 using an adhesive such as an epoxy adhesive.

The piezoelectric element 22 is formed of a piezoelectric material. Examples of the piezoelectric materials include, but are not limited to, inorganic piezoelectric materials such as lead zirconate titanate (what is called PZT), crystal, lithium niobate ($LiNbO_3$), potassium tantalate niobate (K(Ta, Nb) $O_3$), barium titanate ($BaTiO_3$), lithium tantalate ($LiTaO_3$), and strontium titanate ($SrTiO_3$). The piezoelectric element 22 may be configured into a laminated structure that alternately stacks a plurality of piezoelectric layers formed of a piezoelectric material and a plurality of electrode layers.

The piezoelectric element 22 includes a pair of electrodes 23A and 23B. The electrodes 23A and 23B extend, respectively, from lateral surfaces 22c and 22d that face each other to the bottom surface 22b. The electrodes 23A and 23B may be formed by, for example, sputtering of Ag. The piezoelectric element 22 is adjusted (polarization of piezoelectric ceramics) to extend or contract in a direction extending along an axis thereof (axis Z2 illustrated in FIG. 4) when voltage is applied to the piezoelectric element 22 by the pair of electrodes 23A and 23B. Thus, controlling the voltage applied across the electrodes 23A and 23B allows the extension and contraction of the piezoelectric element 22 to be controlled.

The rectangular columnar shape of the piezoelectric element 22 is illustrative only and not limiting. The piezoelectric element 22 may be formed into, for example, a cylindrical column. The piezoelectric element 22 is required only to be capable of extending and contracting in one direction.

The drive shaft 24 is formed of a composite resin material including a fiber such as a carbon fiber. The drive shaft 24 has a cylindrical columnar shape having a width wider than a width of the piezoelectric element 22. The drive shaft 24 is aligned with the axis Z2 of the piezoelectric element 22.

The weight 26 is formed of a material having a high specific gravity, such as tungsten and tungsten alloy. The weight 26 is thus designed to be heavier than the drive shaft 24. The weight 26, being designed to be heavier than the drive shaft 24, is less likely to be displaced and allows the drive shaft 24 to be efficiently displaced when the piezoelectric element 22 extends and contracts. The weight 26 has a rectangular flat sheet shape and is aligned with the axis Z2 of the piezoelectric element 22. The weight 26 includes a pair of electrodes 27A and 27B. The electrodes 27A and 27B extend from an end face 26a of the weight 26 on the side adjacent to the piezoelectric element 22 to one lateral surface 26b. Of the electrodes 27A and 27B, the electrode 27A is electrically connected with the electrode 23A disposed on the piezoelectric element 22 and the electrode 27B is electrically connected with the electrode 23B disposed on the piezoelectric element 22.

Figure 3:
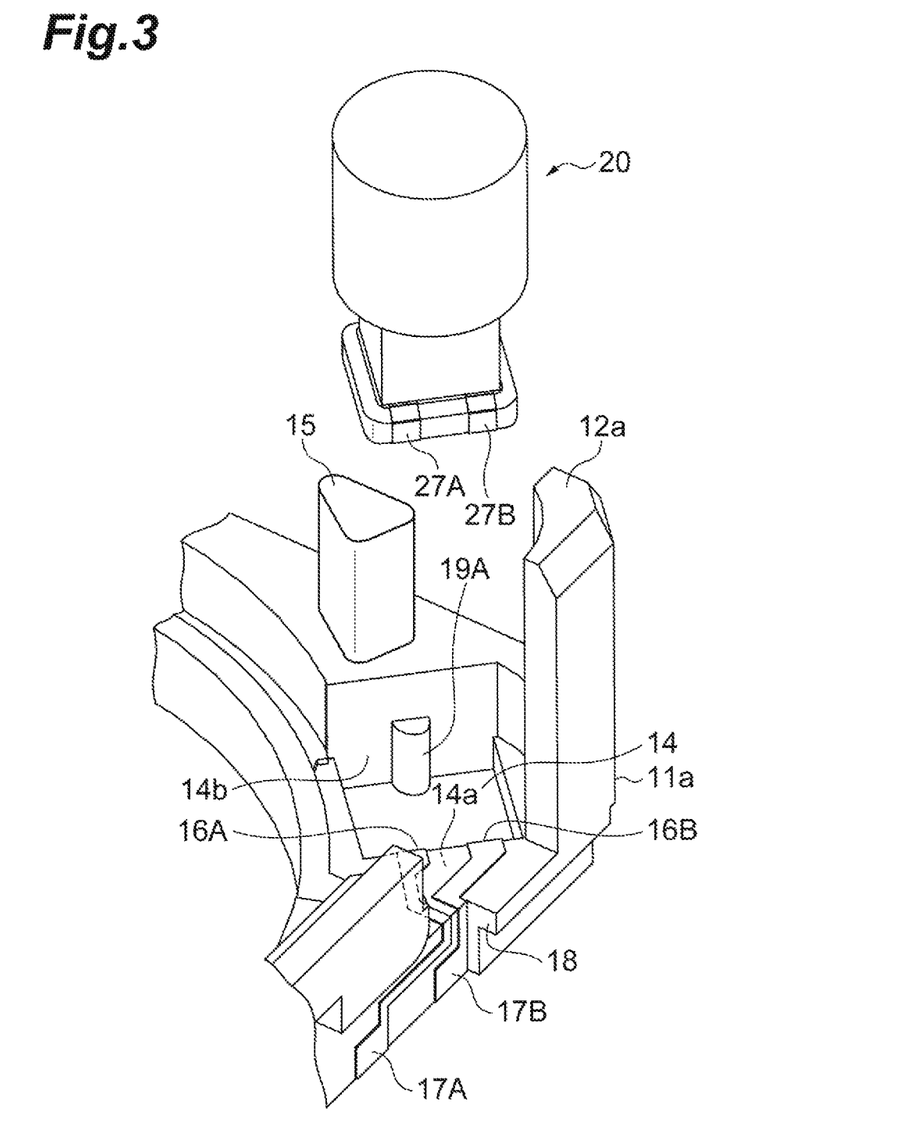
FIG. 3 is a view illustrating a mode in which an actuator is mounted in a base member.

Reference is made back to FIG. 3. The actuator holding portion 14 of the base member 10 is designed to have a shape and dimensions such that the weight 26 of the actuator 20 can be generally housed therein. The actuator holding portion 14 is designed to have a depth deeper that a height of the weight 26 of the actuator 20 so as not to allow the weight 26 of the actuator 20 to be easily dislocated. The lens drive unit 1 is designed such that, when the actuator 20 is disposed in the actuator holding portion 14 in the base member 10, the axis Z2 of the actuator 20 extends in parallel with the lens optical axis Z1 of the lens drive unit 1.

Figure 5:
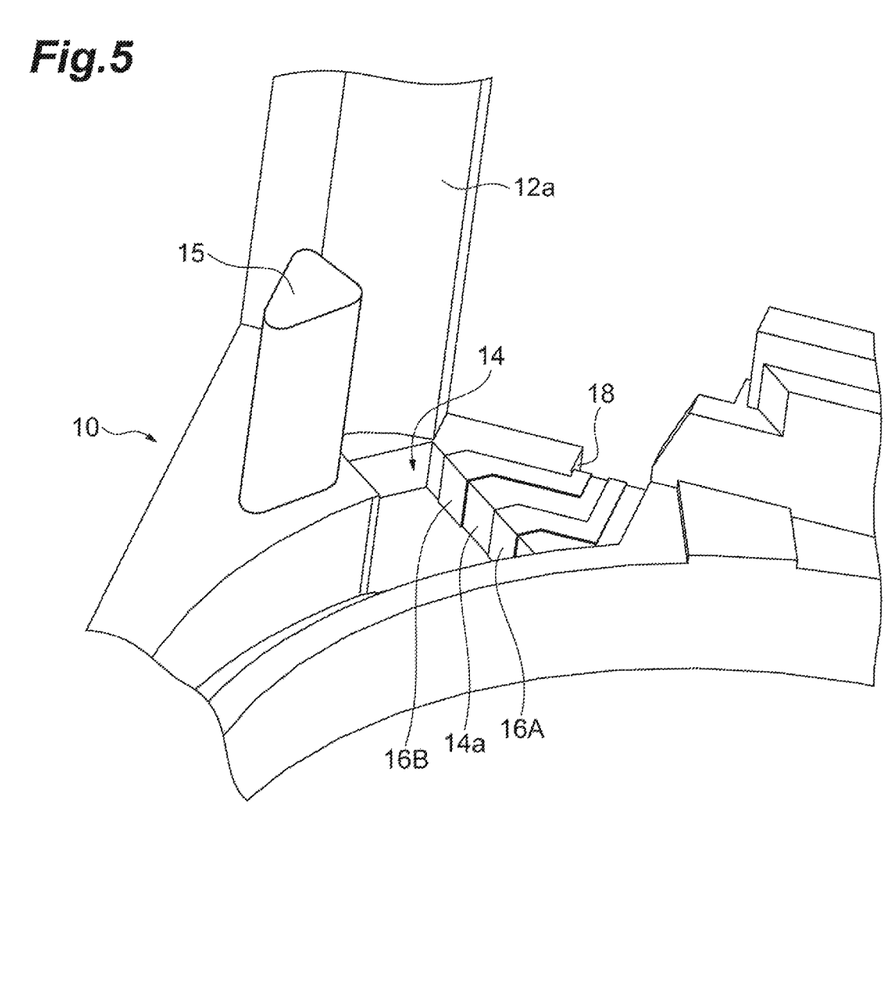
FIG. 5 is a perspective view illustrating terminal electrodes disposed on an inner lateral surface of an actuator holding portion.

The base member 10 includes a pair of terminal electrodes (electric wires) 16A and 16B that are withdrawn to an outside from an inner lateral surface of the actuator holding portion 14 as illustrated in FIGS. 3 and 5. The terminal electrodes 16A and 16B are each disposed on one inner lateral surface 14a and each extend over an entire length in a depth direction of the actuator holding portion 14. In addition, the terminal electrodes 16A and 16B are disposed on the one inner lateral surface 14a at positions corresponding to the electrodes 27A and 27B disposed on the lateral surface 26b of the weight 26. Thus, when the weight 26 of the actuator 20 is housed in the actuator holding portion 14, the terminal electrodes 16A and 16B directly contact, and are thus electrically connected to, the electrodes 27A and 27B, respectively, of the weight 26.

Figure 6:
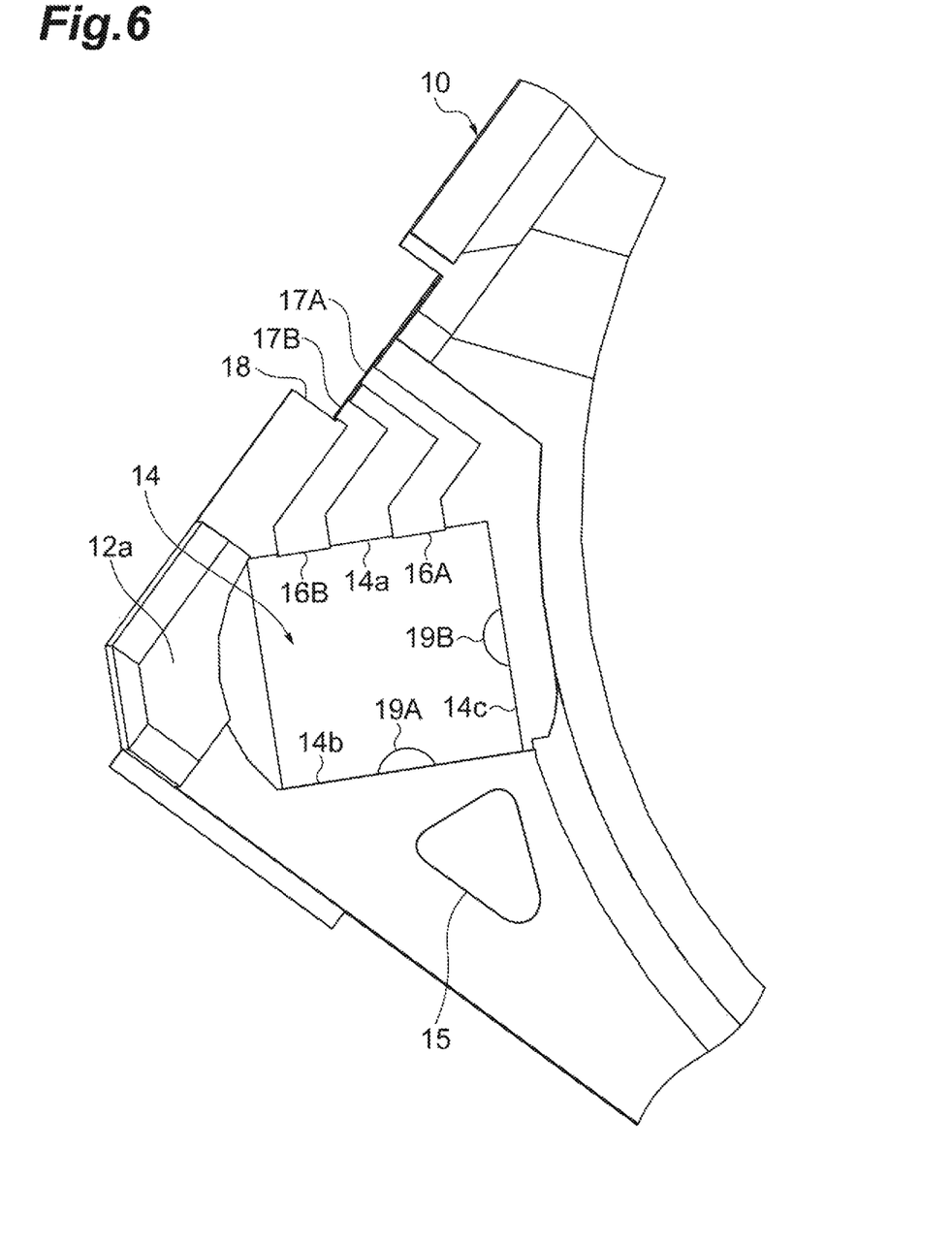
FIG. 6 is a plan view illustrating the actuator holding portion of a base member.

As illustrated in FIG. 6, the actuator holding portion 14 includes two protrusions 19A and 19B provided integrally with the base member 10. The protrusions 19A and 19B each have a columnar shape extending from the bottom surface of the actuator holding portion 14 in the depth direction. More specifically, the protrusions 19A and 19B are each a semi-cylinder having a semi-circular cross section. The protrusions 19A and 19B are each formed such that a curved surface of the semi-cylinder is oriented toward the inside of the actuator holding portion 14. Additionally, the protrusions 19A and 19B are each chamfered so that an upper end thereof renders a slant surface. Of the two protrusions 19A and 19B, the protrusion 19A is disposed substantially at a center of a lateral surface 14b that faces the inner lateral surface 14a on which the terminal electrodes 16A and 16B are disposed. The protrusion 19B is disposed substantially at a center of a lateral surface 14c that is adjacent to the lateral surface 14b on which the protrusion 19A is disposed.

The pair of terminal electrodes 16A and 16B of the actuator holding portion 14 is withdrawn, via a cutout 18 in the base member 10, up to a pair of external terminal electrodes 17A and 17B that are connected with an external control circuit of the lens drive unit 1. Thus, a voltage signal applied across the external terminal electrodes 17A and 17B is applied across the electrodes 23A and 23B of the actuator 20 via the terminal electrodes 16A and 16B of the actuator holding portion 14, so that the actuator 20 extends and contracts.

The friction engagement unit 30 includes the lens frame 40 and the friction engagement member 50 that frictionally engages the actuator 20.

The lens frame 40 has a circular tubular shape oriented in the direction of the lens optical axis Z1. The lens frame 40 is disposed on the bottom 11 of the base member 10 so as to be surrounded by the first lateral wall 12a, the second lateral wall 12b, the third lateral wall 12c, and the fourth lateral wall 12d. The lens frame 40 has an opening 41 at a center thereof. The lens L can be mounted in the opening 41 so as to be oriented in the direction of the lens optical axis Z1. The lens L may be a lens unit including a plurality of lenses or may even be a single lens. The opening 41 of the lens frame 40 has a dimension substantially identical to a dimension of the opening 11e in the bottom 11.

The lens frame 40 has the first protrusion 42 formed on an outer peripheral surface thereof. The first protrusion 42 fits in the cutout 13 in the second lateral wall 12b of the base member 10. The first protrusion 42 has a shape and dimensions that are substantially identical to a shape and dimensions of the cutout 13. Specifically, the cutout 13 is slightly larger than the first protrusion 42, so that the first protrusion 42 can be fitted into the cutout 13. The fitting achieved between the first protrusion 42 of the lens frame 40 and the cutout 13 in the second lateral wall 12b prevents the lens frame 40 from rotating about the lens optical axis Z1.

Additionally, the lens frame 40 includes a fixing portion 43 provided on the outer peripheral surface thereof. The fixing portion 43 houses a trailing end 50b of the friction engagement member 50 to be described later to thereby position and fix in place the friction engagement member 50.

The lens frame 40 further has a second protrusion 44 formed on the outer peripheral surface thereof at a position close to the first lateral wall 12a of the base member 10. The friction engagement member 50 has a leading end 50a abutting on the second protrusion 44. The friction engagement member 50 is thereby be positioned by the second protrusion 44.

The friction engagement member 50 is a band-shaped metal part having elasticity. The friction engagement member 50 is disposed along the outer peripheral surface of the lens frame 40. The friction engagement member 50 has the leading end 50a that frictionally engages the actuator 20 and the trailing end 50b that assumes a fixing end to be fixed in the fixing portion 43 of the lens frame 40. At least the leading end 50a of the friction engagement member 50 is disposed so as to be orthogonal to the lens optical axis Z1 and the axis Z2 of the actuator 20. The friction engagement member 50 is obtained through blanking and bending of a single sheet of metal.

The friction engagement member 50 has the leading end 50a trifurcated. The trifurcated leading end 50a includes the I-shaped spring portion 52 extending from a central portion in a width direction of the friction engagement member 50 linearly in a direction in which the friction engagement member 50 extends and the U-shaped shaft receiver (slider portion) 54 extending from both ends in the width direction along the outer peripheral surface of the lens frame 40.

Leading ends 54a of the shaft receiver 54 are bent substantially at right angles along a substantially right-angled corner defined between the outer peripheral surface and the second protrusion 44 of the lens frame 40. The drive shaft 24 of the actuator 20 is clamped between a free end 52a of the spring portion 52 and the leading ends 54a of the shaft receiver 54 and is biased toward the shaft receiver 54 from the spring portion 52 by the elasticity of the spring portion 52. Thus, the friction engagement member 50 frictionally engages the drive shaft 24 of the actuator 20.

As described above, in the lens drive unit 1, when a difference in speed is produced between when the actuator 20 extends and when the actuator 20 contracts during the extension and contraction of the actuator 20, the friction engagement member 50 having the first end 50a frictionally engaging the outer periphery of the drive shaft 24 of the actuator 20 is driven in the direction in which the actuator 20 extends and contracts. As the friction engagement member 50 is driven, the lens frame 40 disposed at the second end 50b of the friction engagement member 50 is also driven in the direction in which the actuator 20 extends and contracts. The lens frame 40, because being disposed such that the lens L is to be mounted therein so as to have the lens optical axis Z1 oriented in a direction extending in parallel with the direction in which the actuator 20 extends and contracts (Z2 direction), can drive the lens L in the direction of the lens optical axis Z1.

It is here noted that the lens frame 40 in which the lens L is mounted has a specific gravity higher than a specific gravity of the actuator 20. Thus, when the lens frame 40 is displaced, the lens frame 40 presses the actuator 20 accordingly. As a result, the actuator 20 is inclined with respect to the base member 10. This condition can cause the weight 26 of the actuator 20 to be dislocated from the base member 10 and the electric wire for applying voltage to the piezoelectric element 22 of the actuator 20 to be broken, resulting in a short-circuited electric wire.

In the lens drive unit 1, however, the actuator 20 is fixed to the base member 10 by having the weight 26 housed in the actuator holding portion 14 in the base member 10. Additionally, the electrodes 27A and 27B disposed on the lateral surface 26b of the weight 26 directly contact, and are thus electrically connected with, the terminal electrodes 16A and 16B, respectively, disposed on the inner lateral surface 14a of the actuator holding portion 14. This arrangement achieves enhanced reliability in connection between the electrodes 27A and 27B of the actuator 20 and the terminal electrodes 16A and 16B.

In addition, in the lens drive unit 1, the protrusions 19A and 19B are disposed on the lateral surfaces 14b and 14c, respectively, of the actuator holding portion 14. When the actuator 20 is housed in the actuator holding portion 14, the protrusions 19A and 19B each contact the weight 26 of the actuator 20. At this time, each of the protrusions 19A and 19B is compressed and thus urges the weight 26 with a reaction to the compression. As a result, the actuator 20 is rigidly fitted in the actuator holding portion 14. Hence, the actuator 20 is even more effectively prevented from being dislocated from, and deviated with respect to, the actuator holding portion 14.

It is further noted that, in the lens drive unit 1, the protrusion 19A is disposed on the lateral surface 14b that faces the inner lateral surface 14a on which the terminal electrodes 16A and 16B are disposed. This arrangement causes the protrusion 19A to urge the weight 26 toward the terminal electrodes 16A and 16B, so that adhesion and reliability of electrical connection are enhanced between the electrodes 27A and 27B of the weight 26 and the terminal electrodes 16A and 16B.

Each of the protrusions 19A and 19B is chamfered so that the upper end thereof renders a slant surface. As a result, when the actuator 20 is to be housed in the actuator holding portion 14, the protrusions 19A and 19B do not serve as a major obstacle against which the actuator 20 abuts, so that the actuator 20 can be readily inserted in the actuator holding portion 14.

It is noted that the above embodiment of the present disclosure is illustrative only and may be embodied in a variety of other forms.

For example, the weight of the actuator and the actuator holding portion are not required to have a rectangular shape and may have a circular, triangular, rectangular, or polygonal shape when the weight and the actuator holding portion have a shape similar to each other.

In addition, the shape of the protrusions of the actuator holding portion is not limited to the semi-cylinder, but may be an elliptic cylinder or a polygonal cylinder. The number of protrusions is not limited to two, but may be three or more. For the positions of the protrusions, at least one of the protrusions is required to be disposed at a position facing the position at which the electric wire is disposed across the axis of the actuator. This requirement enhances adhesion and reliability of the electrical connection between the electrodes of the weight and the terminal electrodes.

What is claimed is:

1. A lens drive unit comprising:
    an actuator, the actuator including:
        a piezoelectric element configured to be capable of extending and contracting in one direction;
        a weight joined with one end face of the piezoelectric element in a direction of extension and contraction of the piezoelectric element; and
        a shaft joined with the other end face of the piezoelectric element in the direction of extension and contraction of the piezoelectric element;
    a friction engagement member frictionally engaging an outer periphery of the shaft of the actuator;
    a lens frame coupled to the friction engagement member;
    a base member including a holding portion recessed to have a shape of the weight of the actuator to thereby house the weight, the base member being configured to fix the actuator in the holding portion;
    a pair of electrodes disposed on the weight, the pair of electrodes being electrically connected with a pair of electrodes disposed in the piezoelectric element;
    a pair of electric wires disposed on an inner lateral surface of the holding portion, the pair of electric wires contacting the pair of electrodes disposed on the weight; and
    at least two protrusions disposed on an inner lateral surface of the holding portion, the two protrusions each contacting the weight housed in the holding portion.

2. The lens drive unit according to claim 1, wherein
    at least one of the two protrusions is disposed at a position facing positions at which the electric wires are disposed across an axis of the actuator as viewed from the direction of extension and contraction of the actuator.

3. The lens drive unit according to claim 1, wherein
    the friction engagement member includes, on a side of one end of the friction engagement member, a slider portion held by the lens frame and a spring portion biased toward the slider portion, and
    the slider portion and the spring portion clamp therebetween the actuator to frictionally engage the other end of the actuator.

4. The lens drive unit according to claim 1, wherein the friction engagement member has the one end extending in a direction orthogonal to the direction of extension and contraction of the actuator and frictionally engaging an outer periphery of the other end of the actuator, and the friction engagement member has the other end coupled to the lens frame such that a lens is to be mounted so as to have a lens optical axis oriented in a direction extending in parallel with the direction of extension and contraction of the actuator.

* * * * *